United States Patent
Wendelrup et al.

(10) Patent No.: US 6,291,966 B1
(45) Date of Patent: Sep. 18, 2001

(54) METHOD AND AN APPARATUS FOR STORING AND COMMUNICATING BATTERY INFORMATION

(75) Inventors: Heino Wendelrup, Malmö; Michael Kellerman, Åkarp; Johan Mercke; Kristoffer Ptasinski, both of Lund; Jan Rubbmark, Malmö; Jonas Bengtsson, Lund; Charles Forsberg, Skurup, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/491,954

(22) Filed: Jan. 26, 2000

(30) Foreign Application Priority Data

Jan. 27, 1999 (SE) .................................................. 9900302

(51) Int. Cl.[7] ...................................................... H02J 7/00
(52) U.S. Cl. .............................................. 320/106; 702/63
(58) Field of Search ........................... 320/106, DIG. 12; 702/63

(56) References Cited

U.S. PATENT DOCUMENTS 5,619,117  4/1997  Koenck .................................. 320/21
5,635,813  6/1997  Shiga et al. ............................. 320/2

OTHER PUBLICATIONS

H. Sandh, Dec. 2, 1999, International–Type Search Report Request No. SE99/00112, pp. 1–3.

*Primary Examiner*—Peter S. Wong
*Assistant Examiner*—Gregory J. Toatley, Jr.
(74) *Attorney, Agent, or Firm*—Jenkens & Gilchrist, A Professional Corporation

(57) ABSTRACT

A battery system and method are disclosed. The battery system and method include battery means for supplying operating power during battery operation of a battery power receiving device (e.g. a mobile phone). The battery system and method further includes a battery information circuit carried as a unit together with the battery means (e.g. in the form of a so-called battery pack for a mobile phone) for assembly with the battery power receiving device. The battery information circuit includes memory cells and is capable of communicating information with the battery power receiving device. The memory cells include bits encoded to represent an index for a table including battery information; and the battery power receiving device includes a memory capable of storing the table.

17 Claims, 4 Drawing Sheets

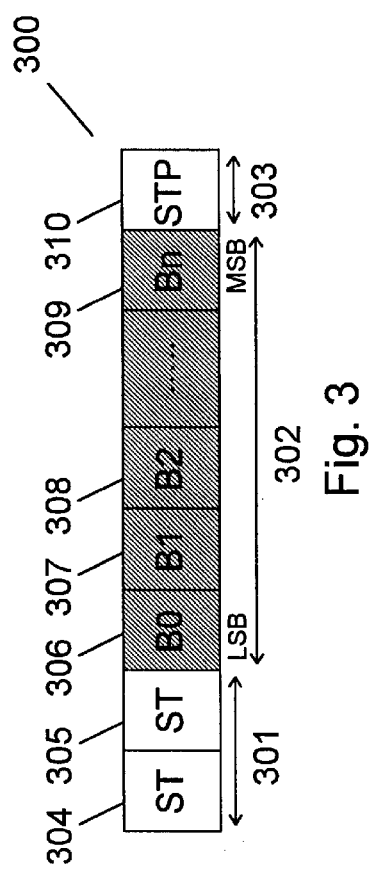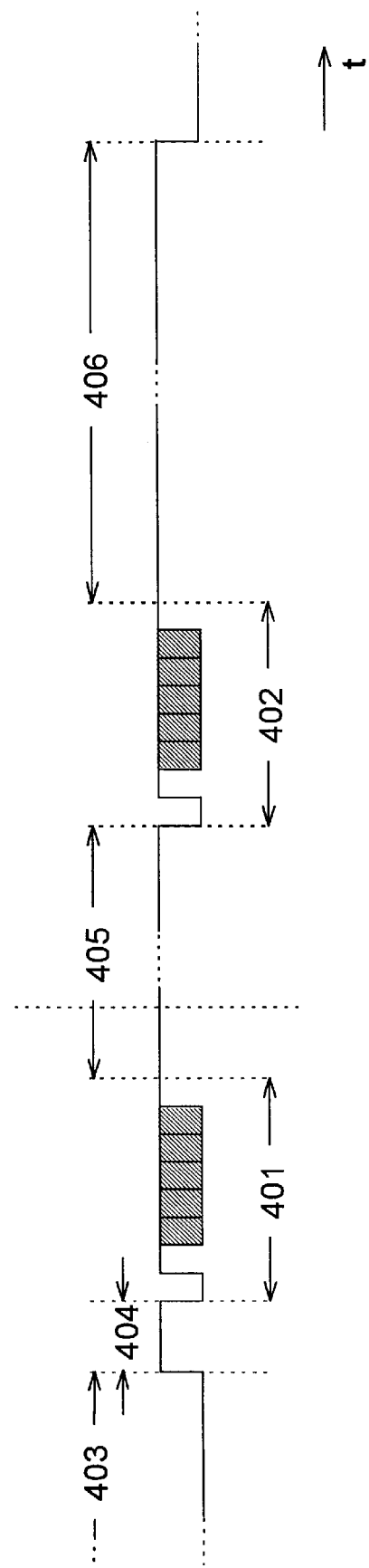
Fig. 3
Fig. 4

METHOD AND AN APPARATUS FOR STORING AND COMMUNICATING BATTERY INFORMATION

BACKGROUND OF THE INVENTION

1. Technical Field

This invention relates to a battery system comprising battery means for supplying operating power during battery operation of a battery power receiving device; a battery information circuit carried as a unit with the battery means for assembly with the battery power receiving device; said battery information circuit having memory cells and being capable of communicating information with the battery power receiving device.

The invention also relates to a battery comprising battery means for supplying operating power during battery operation of a battery power receiving device; a battery information circuit carried as a unit with the battery means; said battery information circuit having memory cells and being capable of communicating information with the battery power receiving device.

Moreover, the invention relates to a method of storing information in a battery information circuit carried as a unit with battery means for assembly with a battery power receiving device and of communicating information between the battery information circuit and the battery power receiving device.

2. Description of Related Art

The development of cellular telephone technology has created a similar need for development in the area of batteries and battery packs, and more specifically for amethod of communicating battery information e.g. in a cellular telephone. The telephones must utilise batteries in order to provide mobile capabilities. The battery is critical to the user of a cellular telephone, since the battery allows the user to move about freely without being tied to a stationary power source.

Thus, in order to fully maximise the use of a cellular telephone, it is important, from a first point of view that a user achieves maximum performance from an attached battery. This may be achieved by e.g. correctly charging the battery and always being able to identify the exact charging status of the battery. This enables a user to know how much standby time is left on the phone. This type of information enables a user to intelligently decide whether the charge in the battery is sufficient for his needs, or whether charging of the battery is required.

However, from a second point of view and in order to aid the user in achieving such maximum performance from the battery, it is important that the cellular telephone itself is able to achieve maximum performance from an attached battery e.g. by charging and discharging the battery according to given specifications. Such specifications are typically stated as parameters and can comprise minimum and maximum charging and discharging temperatures, maximum charging current and voltage, etc.

Thus the battery system must be capable of handling such various types of parameters which will often have parameter values within different ranges e.g. temperatures between –20 and 100° C., currents between 200 and 4000 mA, etc.

Due to the fact that such specifications are battery specific in order to achieve maximum performance, a well-known solution within the field of battery powered equipment is to provide a so-called 'smart' battery or battery system. Such a battery system comprises a battery and a microprocessor capable of providing advanced battery information to the battery powered equipment e.g. a cellular mobile telephone.

Battery systems used in small-sized hand held electronic equipment especially mobile phones differ from ordinary battery systems in that low weight and hours of use, i.e. time the equipment can be used without having to recharge the battery, are extremely important competition parameters. Further, price is an extremely important parameter in the competition with other vendors of mobile telephones and accessories for mobile telephones, since most vendors are capable of providing almost the same functionality of the equipment and in that such equipment is sold as consumer products. Consequently, there is an extremely great desire for a low-cost battery system solution.

U.S. Pat. No. 4,709,202 discloses a battery powered system comprising a microprocessor permanently secured to the battery so as to receive operating power therefrom. The performance of a given battery in actual use can be accurately judged since the battery system itself can maintain a count of accumulated hours of use of the battery powered system. Further, the battery system can maintain other relevant parameters e.g. battery temperature, battery output voltage, and battery capacity based on a charging cycle. Thus, from this patent it is known to communicate battery information as such using ordinary communications techniques.

However, this patent does not concern the fact that the storage capacity for storing battery information within the battery system should be limited as much as possible in order to obtain a low-cost embodiment.

Further, typically, the communication between the battery system and the battery powered system is implemented via a simple half-duplex communications line only capable of transferring data with a few hundred bytes per second. Hence, if much superfluous battery information is transmitted back and forth, the system performance may be degraded unnecessarily.

SUMMARY OF THE INVENTION

The present invention provides a battery system which is adapted for use in compact and ultra light weight hand-held electronic equipment.

This is achieved, when the battery system mentioned in the opening paragraph is characterized in that the memory cells include bits encoded to represent an index for a table including battery information; and in that the battery power receiving device comprises memory including the table.

Consequently, only a minimum of data need be stored in the memory cells, while it is possible to decode the minimum of data by means of the table so as to obtain complete and interpretable battery information.

When the index is changeable due to information from the battery power receiving device, the battery information circuit can be implemented as a memory unit not requiring a microprocessor or similar means.

In an expedient embodiment, the battery information circuit comprises means for monitoring the battery and selecting an index for battery information which represents a state of the battery. Thereby, it is possible to acquire information about the actual state of the battery. The acquisition of information can involve measurement of different types of battery parameters.

This is possible in particular when the index is changeable due to information from the monitoring means or from the battery power receiving device. Thereby the acquired information about the actual state of the battery or information from the battery power receiving device can be communicated in the form of an index. This is especially expedient if the battery is detached from the battery power receiving device and later on attached to another battery power receiving device.

When the index is capable of identifying battery information representing the capacity of the battery and/or parameters for a charging algorithm by having stored information representing the capacity of the battery in the table, a user will obtain maximum performance from an electronic device e.g. a mobile cellular telephone.

In an expedient embodiment the index is represented by means of a number of bits providing a number of binary combinations, the number of binary combinations corresponding to a number of entries in the table. Thereby a very compact representation of battery information is obtained, and the representation is easily encoded/decoded by means of the table.

When the memory cells include bits encoded to represent a number of indexes for identifying battery information in a number of tables, respectively, it is possible to represent different types of battery information in different tables. Further, it is possible to select an index representation expediently capable of representing a preselected number of possible parameter values in the tables, respectively.

Secondly, the present invention provides a battery which is adapted for use in compact and ultra light weight handheld electronic equipment.

This is achieved, when the battery mentioned in the opening paragraphs is characterized in that the memory cells include bits encoded to represent an index to a table including battery information.

Consequently, only a minimum of data need be stored in the memory cells.

Preferred embodiments of the battery are given in dependent claims 9–12.

Also, the present invention provides a method of storing and communicating battery information in a battery system which is adapted for use in compact and ultra light weight hand-held electronic equipment.

This is achieved, when the method mentioned in the opening paragraphs is characterized in that the method comprises the steps of storing an index for a table in the battery information circuit, said table including battery information and being stored in the battery power receiving device.

Consequently, only a minimum of data need be stored in the memory cells and a minimum of bandwidth is needed when communicating between the battery information circuit and the battery power receiving device.

Preferred embodiments of the method are given in dependent claims 14–16.

The invention will be explained more fully below in connection with a preferred embodiment and with reference to the drawing, in which:

FIG. 3 is an example of a byte to be used in relation to the above mentioned transmission, FIG. 4 illustrates the transmission of bytes.

Figure 1:
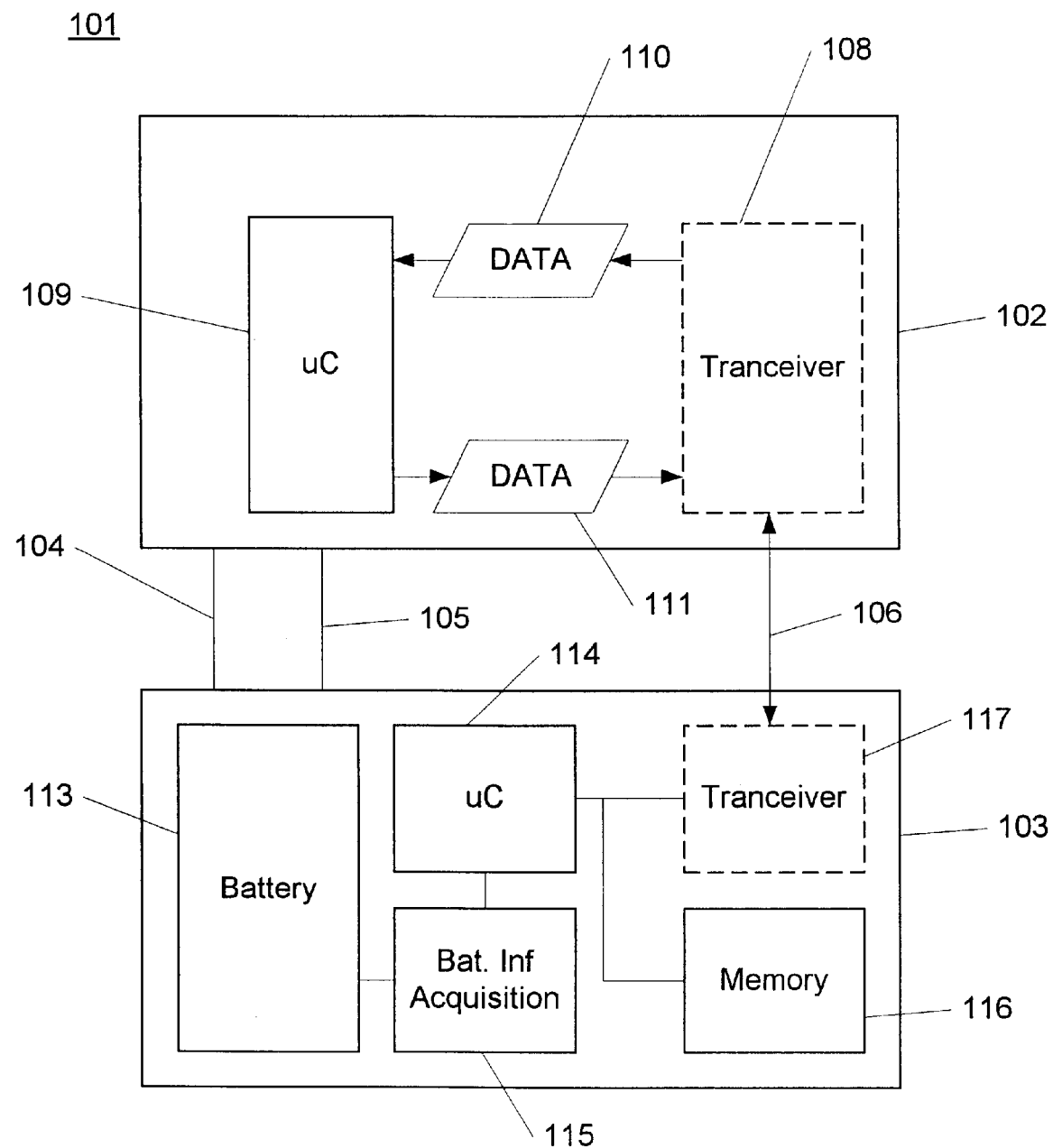
FIG. 1 shows an apparatus according to the invention.

FIG. 1 shows an apparatus 101 comprising an electronic device 102 and a battery or battery pack 103 attached thereto. The apparatus 101 further comprises a number of connections 104, 105, 106 connecting the electronic device 102 and the battery 103 and thus allowing communication between the electronic device 102 and the battery 103.

The electronic device 102 comprises a transceiver 108, which is also called the first communications means in the following, and a micro-controller 109. The transceiver 108 and the micro-controller 109 are adapted to exchange data, which is illustrated by means of the reference sign 110 and 111 in the figure. The micro-controller 109 can transmit information to the transceiver 108 by means of the connection 111. Likewise the connection 110 can be used to transmit data from the transceiver 108 to the micro-controller 109. The transceiver 108 may be a universal asynchronous receiver transmitter (UART).

The battery includes one or more battery cells 113, a micro-controller 114 (which may be a state machine), a battery information acquisition unit 115, a transceiver 117 and a memory 116. It is noted that the transceiver 117 is also called the second communications means in the following. Also the transceiver 117 may be a universal asynchronous receiver transmitter (UART).

The connections 104 and 105 are used to supply power from the battery 103 to the electronic device 102. For example the connector 104 may be connected to the positive pole of the battery cells 113 in the battery 103, and the connector 105 may be connected to a battery negative pole (GND) of the battery cells 113 in the battery 103.

The transceiver 108 included in the electronic device 102 is connected to the transceiver 117 in the battery 103 by means of the connection 106 enabling digital, serial communication comprising transmission of bytes consisting of a number of bits between the first and the second communications means. The memory 116 is adapted to store a number of data information, for example an identification number of the battery, the maximum capacity of the battery, the current capacity of the battery, etc.

The micro-controller 114 is connected to the transceiver 117, to the battery information acquisition unit 115, and to the memory 116. The battery information acquisition unit 115 is connected to the battery cells 113 and is adapted to retrieve battery information, such as the current battery capacity, etc. from the battery cells 113. The battery information acquisition unit 115 is adapted to transmit the information to the micro-controller 114 when instructed to do so by the micro-controller 114. The micro-controller 114 is adapted to store and retrieve the information from the memory 116 and to transmit the information to the electronic device 102 by means of the transceiver 117.

Figure 2:
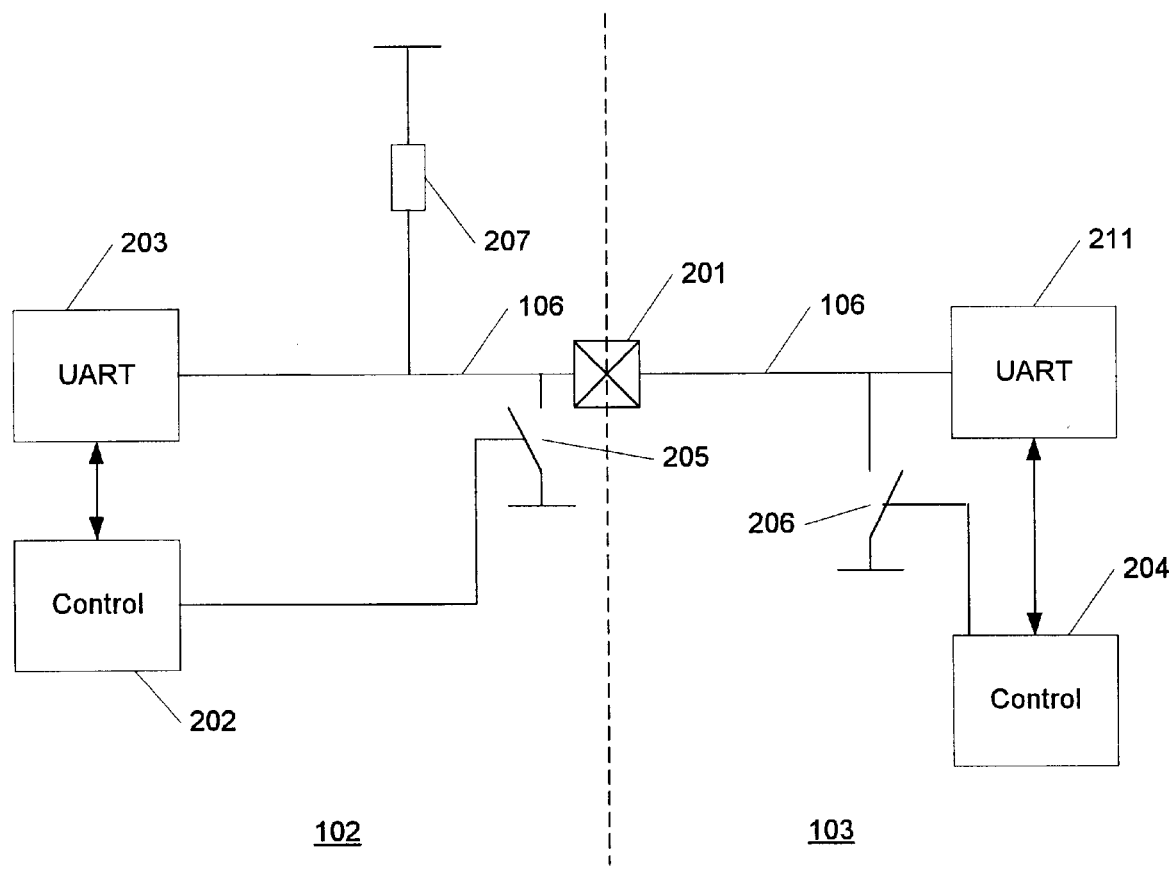
FIG. 2 illustrates a part of an electronic device interfacing with a part of the battery.

FIG. 2 illustrates a part of the electronic device 102 interfacing with a part of the battery 103 and shows the connection 106 adapted to connect the electronic device 102 and the battery 103 in relation to the connection 106 shown in FIG. 1. The left side of FIG. 2 illustrates a part of the electronic device 102 while the right side of FIG. 2 illustrates a part of the battery 103. As shown in the figure, the electronic device 102 and the battery 103 are connected by means of an interface 201.

The electronic device 102 includes a control unit 202 and a universal asynchronous receiver transmitter unit 203, i.e. a so-called UART. Likewise, the battery 103 includes a control unit 204. The electronic device 102 and the battery 103 are adapted to transmit data via the interface 201. The transmission is performed by means of a pull-up resistor 207, a switch 205, and a switch 206. The switch 205 in the electronic device is connected to be controlled by the control unit 202. Likewise, the switch 206 in the battery 103 is connected to be controlled by the control unit 204.

The switch 205 and the switch 206 are both connected to ground potential. This enables the control units 202, 204 to transmit information over the interface 201 in turn. The transmission of information from the electronic device 102 to the battery 103 is controlled by the control unit 202. The control unit 202 is adapted to control the switch 205 and hereby send the information to the battery 103. For example, when the switch 205 is open, the pull-up resistor 207 pulls the potential at the communications line 106 to a high level. On the other hand, when the switch is closed, the potential at the communication line 106 is at a low level. Hereby, by controlling the position of the switch 205 the control unit 202 controls the potential at the communications line 106, and as the communication line is connected to the battery 103 information can be transmitted from the electrical device 102 to the battery 103.

Likewise, the control unit 204 can transmit information from the battery 103 to the electronic device 102 by means of the switch 206. The data generated by the switch 205 in the electronic device 102 are received in a UART 211 which can be similar to the UART 203 in the electronic device 102.

In a preferred embodiment, bytes including a number of bits are transmitted between the electronic device 102 and the battery 103. The format of these bytes is illustrated in FIG. 3.

FIG. 3 shows an example of a byte consisting of a number of bits which can be used in relation to the above-mentioned transmission. The byte 300 is divided into three sections: a first section 301 including two start bits, a second section 302 including a number of data bits, and a third section 303 including a stop bit.

The first section 301 includes two start bits 304, 305 and is used to indicate the start of the byte 300 during transmission. Preferably, the start bits have different values, e.g. the start bit 304 is a logic "0" while the start bit 305 is a logic "1". The second section 302 includes a number of data bits (for example eight) having values depending on the information being transmitted. The third section 303 includes a stop bit used to indicate the end of the byte. As will become clear from the following, the stop bit is often not necessary, e.g. when the transmitted bytes are separated by periods having a signal level corresponding to the value of the stop bits, or when bytes transmitted have a fixed length.

FIG. 4 is a timing diagram illustrating the transmission of bytes over the communications line 106 between the electronic device 102 and the battery 103. Note that the time is increasing from the left to the right in the figure.

The figure shows a first byte 401 being transmitted from electronic device 102 to the battery 103 via the communication line 106 followed by a second byte 402 being transmitted in the reverse direction via the communications line 106, i.e. from the battery 103 to the electronic device 102.

The time intervals illustrating the transmission of the first byte and the transmission of the second byte are separated by a time interval indicated by 405 in the figure. The duration of the time interval 405 is specified by the required response time and minimum set-up time for reversing the direction of communication.

One or more of the electronic means in the battery, e.g. the micro-processor 114 can be in an active state or in a power saving state. In the power saving state the communication line is in a so-called idle state. Hereby, the power consumption of these electronic means can be reduced during periods when no bytes are transmitted between the electronic device 102 and the battery 103.

Prior to the transmission of the first byte the transmission line is in idle state in which the signal level on the transmission line equals a level of logic "0". In the figure the idle period situation is indicated by the reference sign 403. The control unit 202 brings the transmission line into an so-called active state by bringing the signal level on the transmission line 106 to a high level as indicated by the period 404 in the figure. The period 404 is a so-called wake-up period in which one or more of the electronic means in the battery are brought from a power saving state to a normal power consumption state.

As illustrated to the right in the figure, the byte 402 is followed by a an interval 406 in which the signal level at the transmission line 106 equals a level of logic "1", i.e. a situation similar to the situation indicated by the interval 405. The minimum duration of the time interval 406 is specified by the required response time and minimum set-up time for reversing the direction of communication. The interval 406 is followed by a shift from the level of logic "1" to a level of logic "0" indicating a situation in which the transmission line 106 is brought into an idle state. Alternatively, the shift could be indicating the start of a new byte being transmitted, i.e. the shift corresponds to the beginning of a new start bit. It is noted that the transmission line can be brought into an idle state when the duration of the time interval 406 exceeds a given predefined value.

The bytes transmitted via the transmission line 106 can include instructions as well as data. The instructions may include so-called read-only instructions sent by the electronic device 102 and instructing the battery 103 to read specified information from the memory 116 and send the information as one or more data bytes in response. For example, the read-only instruction may instruct the battery to send information on the nominal capacity or the battery serial number. The instruction may also include so-called read/write instructions. For example instructions causing reading or writing the presently remaining capacity of the battery. Further, the instruction set may include instructions causing sending and receiving information of the battery communications bus revision, and causing reading and writing of a dynamic identification number.

The revision information specifies the communications bus revision supported. After exchanging the revision number of the battery communications bus, the micro-controllers 109,114 can use a common communications standard supported by both the electronic device 102 and the battery 103. Hereby, communication between an electronic device 102 and a battery can be obtained even if one of those only supports a later communications standard than the other.

The dynamic identification number is used for communication purposes. The electronic device 102 is adapted to store a given dynamic identification number in both the memory 116 of the battery 103 and in a memory of the electronic device 102. The dynamic identification number may be stored when a battery 103 is connected to the electronic device 102 but can also be stored at an arbitrary time, provided the battery 103 is connected to the electronic device 102.

When the battery is connected to the electronic device 102 the dynamic identification number is transmitted from the battery 103 to the electronic device 102. Hereafter, the dynamic identification number from the battery 103 is compared to one or more dynamic identification numbers stored in the electronic device 102. If the dynamic identification number of the battery does not correspond to a dynamic identification number from the electronic device 102, it means that the battery has been used by other equipment or it may be a completely brand new battery. Therefore, the electronic device 102 does not have current information about the status of the battery, and the electronic device will retrieve information from the battery 102, e.g. information about the presently remaining capacity of the battery 102. If, on the other hand, the dynamic identification number of the battery corresponds to a dynamic identification number from the electronic device 102, the battery has not been used by other equipment, and the electronic device may use information on the battery stored in the electronic device instead of information retrieved from the battery. Whether the information from the electronic device 102 or information from the battery 103 is used depends on other information stored in the battery 103, e.g. information indicating if the battery has been recharged since being disconnected from the electronic device. If this is the case, the mobile phone retrieves the battery capacity from the battery. If this is not the case, the mobile phone uses previously stored internal information on the battery capacity instead. The reason why it is of interest to use internally stored information instead of information from the battery is that the electronic device is normally able to store the information with a higher resolution because of the greater available memory.

It is noted that the electronic device may be a mobile phone or a battery charger. For example, both a mobile phone and a battery charger may perform the above-mentioned reading and writing of dynamic identification numbers and on this basis decide whether to use previously stored information about the battery 103 or alternatively retrieve the information from the battery 103.

Error handling is essentially based upon an echoing mechanism used for commands and data, i.e. retransmission in relation to commands and data. Referring to FIG. 4, the first byte 401 may be transmitted by the electronic device 102 to the battery 103. When the byte 401 is received by the battery 103, the byte is re-transmitted as the byte 402 from the battery 103 to the electronic device 102. When the byte 402 is received in the electronic device 102, the byte 402 is compared with the byte 401 originally sent. If the bytes 401 and 402 do not coincide an error is detected.

In relation to write commands, re-transmission can be carried out in the following way. Firstly, the byte 401 sent by the electronic device 102 is received by the battery 103. Secondly, the received byte is written into a non-volatile memory 116 of the battery 103. Thirdly, the byte is read from the battery non-volatile memory. And finally, the read byte is retransmitted from the battery 103 to the electronic device 102 and the error detection can be performed. Thus it is also checked that the byte was correctly written into the memory 116.

Note, the above mentioned error detection can also be performed on bytes transmitted from the battery 103 to the electronic device 102.

Figure 5:
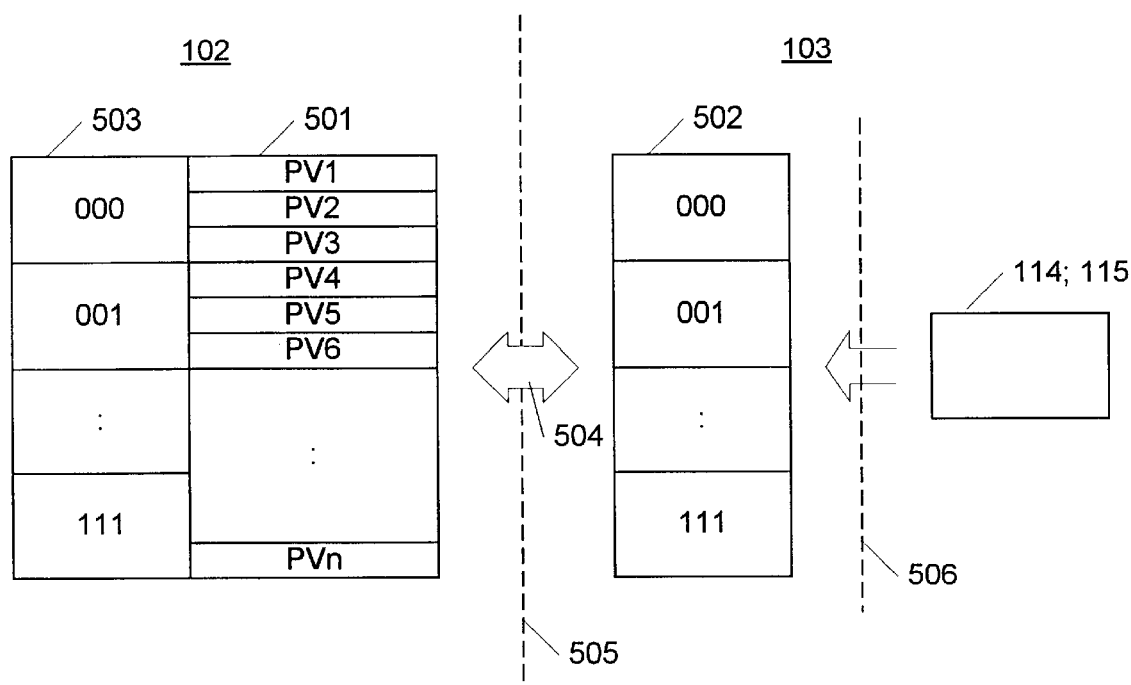
FIG. 5 shows a part of the electronic device interfacing with a part of the battery across an interface.

FIG. 5 illustrates a part of the electronic device 102 (also called the battery power receiving device) interfacing with a part of the battery 103 (also called the battery means) across an interface indicated by the line 505 in the figure. The battery 103 comprises a so-called battery information circuit having a table 502 which includes a number of bits encoded to represent an index for a table including battery information. For example, the contents of the table 502 may be located in a number of memory cells in the memory 116.

The electronic unit 102 comprises a table 501 including a number of parameter values PV1, PV2, ... PVn of different battery information, e.g. remaining battery capacity. It is noted that the battery information may be detailed e.g. the 'resolution' of the remaining battery capacity may be quite high and hereby quite accurate values can be stored. The table 501 also includes a number of index fields 503 which can be used for indexing the information of the table 501.

The index in the table 502 is used for indexing at least some of the parameter values of the table 501 by exchange of information change 504 over the communication line 106 shown in FIG. 1. As it is of interest to reduce the size of the memory 116 in the battery the table 502 holds only a relatively low number of fields each having a relative low number of bits. As the fields is used to represent battery information the 'resolution' of a given parameter is therefore relatively low. Therefore the index in the table 502 is used to point out parameter values (with a higher 'resolution') in the table 501. For example, field holding the index '001' points out one or more parameter values having the corresponding value but with a higher resolution. In the given example three parameter values PV4, PV5 and PV6 are pointed out.

As mentioned, the register 502 hold battery information having a resolution determined by the number of bits in the fields. In order to reduce the memory size, the number of bits is reduced. As a consequence the information is stored with a given 'low resolution'. When initialising, e.g. after connecting a battery 103 to the electronic device 102, the electronic device 502 reads the value stored in the field holding the desired information. During operation the electronic device 102 keeps track of the battery parameters and the can parameter can be updated (internally) and be stored in the table 501 with a high resolution and a corresponding low resolution value can be stored in the battery. Therefore, as long a the battery is connected to the electronic device 102 or the battery can be recognized by the electronic device, the electronic device holds more detailed information of the battery parameter than the battery itself.

The index included in the table 502 can be changed (e.g. as a result of the current battery capacity) by the electronic device 102 but can also be updated by the battery information acquisition unit 115 which for example is controlled by a micro-controller 114 in the battery. In the case where the battery does not include a micro-controller the battery information acquisition unit 115 may be controlled by the micro-controller 109 in the electronic device 102 by use of the communication line 106. For example, the battery information acquisition unit 115 is used for measuring the current capacity of the battery and to used the measured information to update the contents of the table 502.

Note, the shown table 502 includes only codes having 3 bits but an arbitrary number of bits may be used, e.g. depending on the type of information to be stored. The relation between the tables 502 and 503 is a simple one-to-one relation.

The relation between the tables 501 and 503 can be made in many ways, e.g. the upper most field in the table 502 (which may relate the current capacity of the battery) may relate to the upper most parameter value (PV1, PV4, ..., $PV_{n-2}$) of the field in the table 501 relating to the field 503 having the same value as the given field in the table 502. Likewise, the field just below the upper most field in the table 502 may relate to the fields just below the upper most parameter value (PV2, PV5, ..., PV$_{n-1}$) of the field in the table 501 relating to the field 503 having the same value as the given field in the table 502.

In a preferred embodiment the parameter values PV1–PVn represent a specified range of parameter values. Thus according to the invention an extensive representation of the full dynamic range for the parameters can be avoided.

Although preferred embodiments of the method and apparatus of the present invention have been illustrated in the accompanying drawings and described in the foregoing detailed description, it is understood that the invention is not limited to the embodiments disclosed, but is capable of numerous rearrangements, modifications, and substitutions without departing from the spirit of the invention as set forth by the following claims.

What is claimed is:

1. A battery system comprising:

a battery operable to supply operating power during battery operation of a battery power receiving device; and a battery information circuit carried as a unit with the battery for assembly with the battery power receiving device, said battery information circuit having memory cells and being operable to communicate information with the battery power receiving device, wherein the memory cells include bits encoded to represent an index for a table including battery information, and the battery power receiving device comprises a memory including the table.

2. The system according to claim 1, wherein the index is changeable due to information from the battery power receiving device.

3. The system according to claim 1, wherein the battery information circuit comprises a monitoring unit operable to monitor the battery and select an index for battery information which represents a state of the battery.

4. The system according to claim 3, wherein the index is changeable due to information from the monitoring unit.

5. The system according to claim 1, wherein the index is used to identify battery information representing the capacity of the battery by having stored information representing a capacity of the battery in the table.

6. The system according to claim 1, wherein the index is represented by a number of bits providing a number of binary combinations, the number of binary combinations corresponding to a number of entries in the table.

7. The system according to claim 1, wherein the memory cells include bits encoded to represent a number of indexes for identifying battery information in a number of tables.

8. The system according to claim 1, wherein the index is capable of identifying parameters for a charging algorithm by having stored information representing the capacity of the battery in the table.

9. A battery comprising:

a battery unit operable to supply operating power during battery operation of a battery power receiving device; and a battery information circuit carried as a unit with the battery unit, said battery information circuit having memory cells and being operable to communicating information with the battery power receiving device, wherein the memory cells include bits encoded to represent an index for a table including battery information.

10. The battery according to claim 9, wherein the battery information circuit comprises a monitoring unit operable to monitor the battery and select an index for battery information which represent a state of the battery.

11. The battery according to claim 10, wherein the index is changeable due to information from at least one of the monitoring unit and from the battery power receiving device.

12. The battery according to claim 9, wherein the index is used to identify battery information representing capacity of the battery.

13. The battery according to claim 9, wherein the index is represented by a number of bits providing a number of binary combinations, the number of binary combinations corresponding to a number of entries in the table.

14. A method of storing information in a battery information circuit carried as a unit with a battery for assembly with a battery power receiving device and of communicating information between the battery information circuit and the battery power receiving device, said method comprising the steps of:

storing an index for a table in the battery information circuit, said table including battery information and being stored in the battery power receiving device.

15. The method according to claim 14, further comprising the step of: transferring the index from the battery information circuit to the battery power receiving device.

16. The method according to claim 14, further comprising the step of:

using said index to identify battery information in the table.

17. The method according to claim 14, further comprising the step of:

selecting said index to identify battery information in the table, said index representing an actual state of the battery.

* * * * *

UNITED STATES PATENT AND TRADEMARK OFFICE
CERTIFICATE OF CORRECTION

PATENT NO. : 6,291,966 B1
DATED : September 18, 2001
INVENTOR(S) : Wendelrup et al.

It is certified that error appears in the above-identified patent and that said Letters Patent is hereby corrected as shown below:

Drawings,
Fig. 1, Element 108, delete "Tranceiver" and insert -- Transceiver --.
Fig. 1, Element 117, delete "Tranceiver" and insert -- Transceiver --.

Column 1,
Line 33, delete "amethod" and insert -- a method --.

Column 6,
Line 9, delete "an" and insert -- a --.
Line 17, after "by" delete "a".
Line 24, after "to" delete "a" and insert -- the --.
Line 34, delete "and".
Line 58, delete "a" and insert -- the --.

Column 7,
Line 9, delete "102" and insert -- 103 --.
Line 11, delete "102" and insert -- 103 --.

Column 8,
Line 16, delete "relative" and insert -- relatively --.
Line 17, delete "is" and insert -- are --.
Line 26, delete "hold" and insert -- holds --.
Line 32, delete "502" and insert -- 102 --.
Line 35, after "the" delete "can".
Line 35, delete "parameter" and insert -- parameters --.
Line 35, before "stored" delete "be".
Line 38, delete "a" and insert -- as --.
Line 52, delete "to used" and insert -- for using --.

UNITED STATES PATENT AND TRADEMARK OFFICE
CERTIFICATE OF CORRECTION

PATENT NO.   : 6,291,966 B1
DATED        : September 18, 2001
INVENTOR(S)  : Wendelrup et al.

It is certified that error appears in the above-identified patent and that said Letters Patent is hereby corrected as shown below:

<u>Column 10,</u>
Line 9, delete "communicating" and insert -- communicate --.
Line 17, delete "represent" and insert -- represents --.
Line 20, delete "unit" and insert -- units --.
Line 34, delete "steps" and insert -- step --.

Signed and Sealed this

Nineteenth Day of November, 2002

*Attest:*

*Attesting Officer*

JAMES E. ROGAN
*Director of the United States Patent and Trademark Office*